United States Patent
Kanter et al.

(10) Patent No.: US 10,475,085 B2
(45) Date of Patent: *Nov. 12, 2019

(54) VIEW-BASED PLACEMENT OF ADVERTISEMENTS IN SCROLLABLE ADVERTISEMENT UNITS

(71) Applicant: Facebook, Inc., Menlo Park, CA (US)

(72) Inventors: Jeffrey Andrew Kanter, San Francisco, CA (US); David Mason, Seattle, WA (US); Yi Tang, Mountain View, CA (US); Brian Steadman, Seattle, WA (US); Chinmay Deepak Karande, Mountain View, CA (US); Qiao Lian, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 814 days.

This patent is subject to a terminal disclaimer.

(21) Appl. No.: 13/915,438

(22) Filed: Jun. 11, 2013

(65) Prior Publication Data
US 2014/0365320 A1     Dec. 11, 2014

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0277* (2013.01); *G06Q 30/0273* (2013.01); *G06Q 50/01* (2013.01)

(58) Field of Classification Search
None
See application file for complete search history.

(56) References Cited

U.S. PATENT DOCUMENTS

| 8,239,300 B2 | 8/2012 | Lee et al. |
| 2002/0010757 A1* | 1/2002 | Granik .............. G06F 17/30876 709/218 |

(Continued)

FOREIGN PATENT DOCUMENTS

| JP | 2003-281432 A | 10/2003 |
| JP | 2013-054410 A | 3/2013 |
| KR | 10-2011-0137513 A | 12/2011 |
| KR | 10-2012-0016465 A | 2/2012 |
| WO | WO 2011/078975 A1 | 6/2011 |

OTHER PUBLICATIONS

Google Testing Scrolling Adsense Units, https://www.seroundtable.com/archives/015658.html and https://www.youtube.com/watch?v=NVGO-qgBXkU.*

(Continued)

*Primary Examiner* — Michael W Schmucker
(74) *Attorney, Agent, or Firm* — Fenwick & West LLP (57) ABSTRACT

An online system selects advertisements for inclusion in a scrollable advertisement unit that includes a display area and multiple advertisements, each associated with a position in the scrollable advertisement unit. Positions in the scrollable advertisement unit are ranked based on a measure of predicted performance of an advertisement in each position. Advertisements are ranked based on a probability of being viewed by a user if associated with a particular position in the scrollable advertisement unit and, optionally, on a probability of presenting an advertisement based on characteristics of the advertisement. The position ranking and the advertisement ranking are used to associate advertisements with positions. For example, an advertisement is associated with a position having a location in the position ranking corresponding to the advertisement's position in the advertisement ranking.

22 Claims, 4 Drawing Sheets

| Discount Factor | 1.0 | 0.25 | 0.2 | 0.17 | 0.1 |
|---|---|---|---|---|---|
| Ad Unit Position | 1.1 | 1.2 | 1.3 | 1.4 | 1.5 |
| Discount Factor | 0.45 | 0.19 | 0.1 | 0.07 | 0.04 |
| Ad Unit Position | 2.1 | 2.2 | 2.3 | 2.4 | 2.5 |
| Discount Factor | 0.35 | 0.08 | 0.06 | 0.03 | 0.01 |
| Ad Unit Position | 3.1 | 3.2 | 3.3 | 3.4 | 3.5 |

(56) References Cited

U.S. PATENT DOCUMENTS

| | | | |
|---|---|---|---|
| 2003/0101126 A1 | 5/2003 | Cheung et al. | |
| 2003/0216930 A1* | 11/2003 | Dunham | G06Q 30/02 705/26.1 |
| 2006/0224445 A1* | 10/2006 | Axe | G06Q 30/02 705/14.69 |
| 2012/0166532 A1 | 6/2012 | Juan et al. | |
| 2012/0259702 A1 | 10/2012 | Zhang et al. | |
| 2013/0031034 A1 | 1/2013 | Gubin et al. | |
| 2013/0031489 A1 | 1/2013 | Gubin et al. | |
| 2014/0222588 A1 | 8/2014 | Ozaki | |

OTHER PUBLICATIONS

PCT International Search Report and Written Opinion, PCT Application No. PCT/US2014/040175, dated Sep. 23, 2014, seventeen pages.

Goder, A., et al., "Unified Auction Model for Suggesting Recommendation Units and Ad Units," U.S. Appl. No. 13/549,080, filed Jul. 13, 2012.

Hua, M., et al., "Updating Features Based on User Actions in Online Systems," U.S. Appl. No. 13/690,254, filed Nov. 30, 2012.

Kabiljo, I., et al., "Customized Predictors for User Actions in an Online System," U.S. Appl. No. 13/689,969, filed Nov. 30, 2012.

Shalita, A.M., et al., "Dynamic Expressions for Representing Features in an Online System," U.S. Appl. No. 13/690,088, filed Nov. 30, 2012.

Canadian Intellectual Property Office, Office Action, Canadian Patent Application No. 2,912,424, dated Dec. 9, 2016, two pages.

Japan Patent Office, Office Action, Japanese Patent Application No. 2016-519530, dated Feb. 13, 2018, six pages.

Canadian Intellectual Property Office, Office Action, Canadian Patent Application No. 2,912,424, dated Nov. 6, 2017, five pages.

* cited by examiner

| Discount Factor | 1.0 | 0.25 | 0.2 | 0.17 | 0.1 |
| --- | --- | --- | --- | --- | --- |
| Ad Unit Position | 1.1 | 1.2 | 1.3 | 1.4 | 1.5 |
| Discount Factor | 0.45 | 0.19 | 0.1 | 0.07 | 0.04 |
| Ad Unit Position | 2.1 | 2.2 | 2.3 | 2.4 | 2.5 |
| Discount Factor | 0.35 | 0.08 | 0.06 | 0.03 | 0.01 |
| Ad Unit Position | 3.1 | 3.2 | 3.3 | 3.4 | 3.5 |

FIG. 5A

| Position | Ad Value |
| --- | --- |
| 1.1 | HIGH |
| 2.1 | |
| 1.2 | |
| 1.3 | |
| 2.2 | LOW |

FIG. 5B

VIEW-BASED PLACEMENT OF ADVERTISEMENTS IN SCROLLABLE ADVERTISEMENT UNITS

BACKGROUND

This invention relates generally to online systems, and in particular to displaying advertisements on an online system.

Presenting advertisements to users of an online system allows an advertiser to gain public attention for products or services and to persuade online system users to take an action regarding the advertiser's products, services, opinions, or causes. Many online systems generate revenue by displaying advertisements to their users. Frequently, online systems charge advertisers for each presentation of an advertisement to an online system user (e.g., each "impression" of the advertisement).

Additionally, as users more frequently use mobile devices or other devices with limited display area, online systems may combine multiple advertisements into a scrollable advertisement unit. This reduces the display area on which advertisements are presented to reduce the likelihood of user alienation, while allowing users to navigate through the scrollable advertisement unit to view different advertisements. For example, a user may scroll horizontally or vertically through the scrollable advertisement unit to access different advertisements included in the scrollable advertisement unit.

Conventionally, online systems identify an impression of an advertisement if the advertisement is included in a scrollable advertisement, even if a user does not navigate through the scrollable advertisement unit to view the advertisement. For example, a user presented with a scrollable advertisement unit including advertisements does not interact with the scrollable advertisement unit, so only a single one of the advertisements in the scrollable advertisement unit is presented to the user; however, in conventional systems, an impression of each advertisement in the scrollable advertisement unit is credited. Additionally, advertisement-specific properties may make certain advertisements less likely to be viewed or interacted with by users, so presenting these advertisements in the display area of a scrollable advertisement unit may decrease the likelihood of the user viewing other advertisements in the scrollable advertisement unit. This decreases the potential revenue to the online system from presentation of the scrollable advertisement unit.

SUMMARY

An online system derives revenue by displaying advertisements to its users. To reduce the likelihood of alienating users by presenting a large number of advertisements, the online system generates a scrollable advertisement unit including multiple advertisements. The scrollable advertisement unit includes a display area presenting one or more advertisements identified from multiple advertisements included in the scrollable advertisement unit. By interacting with the scrollable advertisement unit, an online system user causes different advertisements from the multiple advertisements included in the scrollable advertisement unit to be presented by the display area.

In various embodiments, the online system users a cost per impression pricing system that charges an advertiser when an advertisement associated with the advertiser is presented to a user. To maximize revenue while more accurately charging advertisers for advertisement impressions, the online system determines an advertisement's position in a scrollable advertisement unit based at least in part on the probability that an advertisement will be viewed based on the advertisement's position in a scrollable advertisement unit and on properties specific to the advertisement.

To identify a position in a scrollable advertisement unit for advertisements, the online system determines the values of positions in the scrollable advertisement unit for advertisements. For example, the online system determines a discount factor for each position in the scrollable advertisement unit describing a measure of predicted performance of an advertisement in each position and subsequently accesses the discount factors to select advertisements for inclusion in the scrollable advertisement unit. Based on the discount factors, the positions of the scrollable advertisement unit ranked. Additionally, bid amounts associated with advertisements are used to rank advertisements. For example, an expected value of each advertisement is determined based on the bid amount of each advertisement and a probability of a user accessing an advertisement, and the expected values are used to rank the advertisements. Based on the ranking of the positions and the ranking of the advertisement, a position in the scrollable advertisement unit is determined for an advertisement. For example, an advertisement having a location in the ranking of advertisements is determined to have a position in the scrollable advertisement unit having a corresponding location in the ranking of positions. The scrollable advertisement unit is generated where an advertisement is associated with its determined position and subsequently sent for presentation to a user.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

An online system presents a scrollable advertisement unit including multiple advertisements to a user. The scrollable advertisement unit includes a display area presenting one or more advertisements identified from multiple advertisements included in the scrollable advertisement unit. To determine a position of an advertisement in the scrollable advertisement unit, the online system determines values of various positions in the scrollable advertisement unit in which advertisements may be placed. For example, the online system determines a discount factor for each position in the scrollable advertisement unit describing a measure of the likelihood of a user interacting with an advertisement in presented in each position. The discount factors are used to select advertisements for inclusion in the scrollable advertisement unit. For purposes of illustration, scrollable advertisement units are described herein as including advertisements; however, in some embodiments, a scrollable advertisement unit may include non-advertising content items, such as user photographs, stories describing actions performed by additional users connected to a user viewing the scrollable advertisement unit, actions suggested by the social networking system for the user viewing the scrollable advertisement unit, or any other suitable information.

The discount factor for a position is calculated using information relating to the likelihood that a user of the online system will interact with an advertisement in the position. For example, historical click-through rates (CTRs) of advertisements presented in a position are used to determine the position's discount factor. Based on the discount factors, the positions of the scrollable advertisement unit ranked.

Additionally, bid amounts associated with advertisements for inclusion in the scrollable advertisement unit are used to rank the advertisements. For example, an expected value of each advertisement is determined based on the bid amount of each advertisement and a probability of a user accessing an advertisement, and the expected values are used to rank the advertisements. Based on the ranking of the positions and the ranking of the advertisement, a position in the scrollable advertisement unit is determined for an advertisement. For example, an advertisement having a location in the ranking of advertisements is determined to have a position in the scrollable advertisement unit having a corresponding location in the ranking of positions.

In one embodiment, advertisements are ranked based on an advertisement value ("ad value") calculated for various advertisements and based on a bid amount associated with an advertisement. To determine an ad value, an advertisement's bid amount bid amount is discounted by a scaling factor, which is based on a probability that the advertisement will be presented in the display area based on its position in the scrollable advertisement unit. The scaling factor may also include a probability that the advertisement not be presented based on one or more characteristics of the advertisement. Ad values are computed for various advertisements for potential inclusion in the scrollable advertisement unit and the advertisements are ranked based on their corresponding ad values. Based on the ranking of the advertisements and the ranking of the positions of the scrollable advertisement unit, positions for advertisements in the scrollable advertisement unit are determined.

Advertisers associated with advertisements included in the scrollable advertisement unit are charged a price that is based on the bid amounts and scaling factors of advertisements included in the scrollable advertisement unit. For example, an advertiser is assessed a fee that is based on the bid amount of an advertisement with a lower ranking than the advertiser's advertisement and a ratio of the scaling factor for the lower ranked advertisement's scaling factor and the scaling factor for the advertiser's advertisement. Additionally, the discount factor of a position in the scrollable advertisement in which an advertisement is presented may be used when determining the price charged to an associated advertiser.

System Architecture

Figure 1:
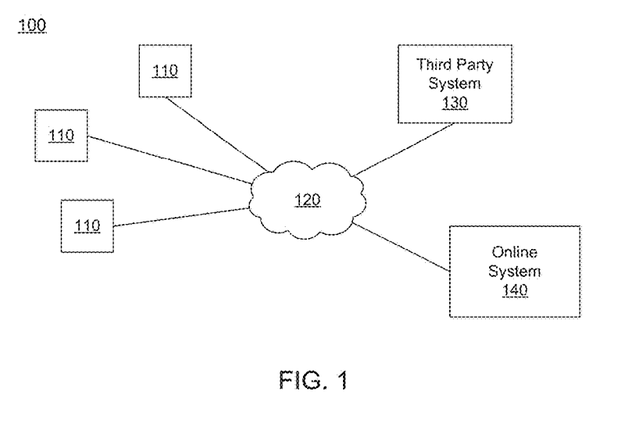
FIG. 1 is a block diagram of a system environment in which an online system operates, in accordance with an embodiment of the invention.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. For example, the online system 140 is a social networking system. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130.

Figure 2:
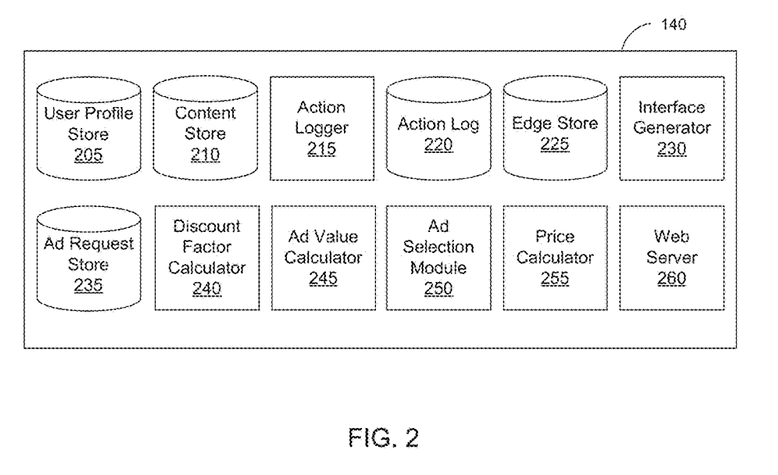
FIG. 2 is a block diagram of an online system, in accordance with an embodiment of the invention.

FIG. 2 is a block diagram of one embodiment of an architecture of the online system 140. The online system 140 shown in FIG. 2 includes a user profile store 205, a content store 210, an action logger 215, an action log 220, an edge store 225, an interface generator 230, an ad request store 235, a discount factor calculator 240, an ad value calculator 245, an ad selection module 250, a price calculator 255, and a web server 260. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, social networking system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The interface generator 230 generates one or more interfaces, such as web pages, including content from the online system 140. For example, interfaces generated by the interface generator 230 include images, video, profile information, or other data. The interface generator 230 also generates one or more interfaces allowing the online system 140 to request information from users and for users to provide information to the online system 140 via the client device 110 and the network 120. For example, the interface generator 230 generates a form for a user to provide biographic information, such as the user's age, for inclusion in the user's user profile. When other users request a user's profile page, the interface generator 230 retrieves data from the profile store 205 and generates a representation of the information in the user profile for presentation by the client device 110.

The interface generator 230 also generates a scrollable advertisement unit having a display area and including multiple advertisements. The scrollable advertisement unit presents one or more advertisements included in the scrollable advertisement unit to a user via the display area. Additionally, a user may interact with the scrollable advertisement unit to navigate among the advertisements in the scrollable advertisement unit to view different advertisements through the display unit. For example, a user may provide horizontal or vertical input to the display area of the scrollable advertisement unit to view different advertisements in the display area of the scrollable advertisement unit. For example, the scrollable advertisement unit presents a single advertisement in the display area and presents additional advertisements from the scrollable advertisement unit in the display area with when the user hovers over or clicks on a horizontal scroll tab, swipes a cursor from right to left, or provides another suitable input. Additionally, the interface generator 230 may replace at least a subset of the advertisements in a scrollable advertisement unit based on received user input. For example, at least a subset of advertisements in the scrollable advertisement unit are replaced with advertisements related to content in an advertisement with which a user has interacted. Replacing advertisements in a scrollable advertisement unit is further described below in conjunction with FIG. 3.

One or more advertisement requests ("ad requests") are stored in the ad request store 235. An advertisement request includes advertisement content and a bid amount. The advertisement content is text data, image data, audio data, video data, or any other data suitable for presentation to a user. In various embodiments, the advertisement content also includes a network address specifying a landing page to which a user is directed when the advertisement is accessed.

The bid amount is associated with an advertisement by an advertiser and specifies an amount of compensation the advertiser provides the online system 140 if the advertisement is presented to a user or accessed by a user. In one embodiment, the bid amount is used by the online system to determine an expected value, such as monetary compensation, received by the online system 140 for presenting the advertisement to a user, if the advertisement receives a user interaction, or based on any other suitable condition. For example, the bid amount specifies a monetary amount that the online system 140 receives from the advertiser if the advertisement is displayed and the expected value is determined based on the bid amount and a probability of a user accessing the displayed advertisement.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. The targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The discount factor calculator 240 calculates a discount factor associated with each position in a scrollable advertisement unit. The discount factor may be used to apply a discount to the amount assessed to an advertiser by the online system 140 for presenting an advertisement in a particular position of the scrollable advertisement unit. For example, different positions in a scrollable advertisement unit have discount factors of 0.25 and 0.45, resulting in a discount of 75% and 55%, respectively, for advertisements presented in the positions. In the preceding example, the position with the discount factor of 0.45 is more valuable than the position with the discount factor of 0.25. A position discount is based on information associated with each position indicating the likelihood of a user interacting with an advertisement presented in a position, such as historical click-through-rate (CTR) of advertisements presented in a position. For example, positions with higher CTRs are more favorable positions, so discount factors resulting in a higher price for advertisements in those positions are determined.

The ad value calculator 245 calculates an ad value for each advertisement being evaluated for inclusion in a scrollable advertisement unit. The ad value is calculated based on a bid amount from an ad request including an advertisement specifying an amount an advertiser will compensate the online system 140 for presentation of the advertisement (cost per impression (CPM)), for user interaction with the advertisement (cost per click (CPC)), or for any other suitable criteria. In calculating the ad value for an advertisement, the bid amount of the advertisement is discounted by a probability of a user viewing the scrollable advertisement unit viewing the advertisement if it is associated with a position in the scrollable advertisement unit. For example, the ad value calculator 245 calculates an ad value for presenting an advertisement in various positions of a scrollable advertisement unit and uses the ad values for various positions when determining a position of the advertisement within the scrollable advertisement unit. The probability of presenting an advertisement in the display area of a scrollable advertisement unit decreases as the position of the advertisement is farther from the display area. For example, if an advertisement is not presented via the display area until a user navigates through five positions including advertisements is less likely to be presented in the display area than an advertisement that is presented via the display area when a user navigates through two positions including advertisement.

In some embodiments, the ad value is also based on advertisement-specific properties that may affect presentation of an advertisement. For example, the ad value is based in part on properties of an advertisement that affect whether the advertisement is rejected when being rendered for presentation to a user. Further, a property specific to an advertisement, such as targeting criteria, may prevent the advertisement from being displayed to a user. For example, an advertisement for an application that can only be run on an IOS® operating system is not presented to a user viewing an advertisement through a client device 110 executing an ANDROID™ operating system. Additionally, privacy settings selected by a user may prevent presentation of an advertisement to a user. For example, an advertisement that requires access to information to which a user has restricted access will not be displayed to the user. Further, advertisements for products or services (e.g., applications) a user has already installed or purchased may not be displayed to the user.

If content items other than advertisements are included in a scrollable advertisement unit, a content item value is determined based on characteristics of the advertisement. For example, stories or other data associated with users connected to the identified user are retrieved and analyzed to identify stories likely to be relevant to the user being presented with a scrollable advertisement unit. Based on various criteria of the user viewing a scrollable advertisement unit, characteristics of various stories, and the probability of a user viewing the scrollable advertisement unit viewing a story if it is associated with a position in the scrollable advertisement unit, scores for presenting stories are determined and to select stories for inclusion in a scrollable advertisement unit. Similarly, scores for presenting suggestions of actions, user photographs, or other content may be determined by the ad value calculator 245 based on characteristics of the content item and the probability of a user viewing the scrollable advertisement unit viewing a story if it is associated with a position in the scrollable advertisement unit. Examples of ranking or selecting stories for presentation to a user are disclosed in U.S. patent application Ser. No. 13/194,770, filed on Jul. 29, 2011, and U.S. patent application Ser. No. 13/194,773, filed on Jul. 29, 2011, each of which is hereby incorporated by reference in its entirety. An example of determining a value for presenting recommendations of actions to a social networking system is disclosed by U.S. patent application Ser. No. 13/549,080, filed on Jul. 13, 2012, which is hereby incorporated by reference in its entirety. As described above, a value for a content item are modified by the probability of a user viewing the scrollable advertisement unit viewing a content item if it is associated with a position in the scrollable advertisement unit to determine a score for presenting the content item in various positions of the scrollable advertisement unit.

The ad selection module 250 accesses ad values from the ad value calculator and selects advertisements for inclusion in a scrollable advertisement unit. For example, the ad selection module 250 ranks advertisements based on their corresponding ad values and selects advertisements based on the ranking (e.g., through an advertisement auction). In one embodiment, the ad selection module 250 selects advertisements having at least a threshold ad value or having at least a threshold ranking. The number of selected advertisements may be based on the number of positions available in the scrollable advertisement unit. For example, if a scrollable advertisement unit includes positions for ten advertisements, the ten highest ranked advertisements are selected for inclusion in the scrollable advertisement unit. Additionally, criteria in addition to the advertisement ranking may be used to select advertisements for inclusion in a scrollable advertisement unit. Examples of criteria of an advertisement affecting advertisement selection include: the advertisement content, the identity of the entity requesting the advertisements, and the pricing scheme for the advertisements (e.g., CPC or CPM).

The price calculator 255 calculates the price of advertisements selected for inclusion in a scrollable advertisement unit. In various embodiments, the price of an advertisement included in the scrollable advertisement unit is based on the bid amounts and scaling factors of other advertisements included in the scrollable advertisement unit. For example, an advertisement's fee is based on the bid amount of an advertisement with a lower ranking than the advertiser's advertisement and a ratio of the scaling factor for the lower ranked advertisement's scaling factor and the scaling factor for the advertiser's advertisement. Additionally, the discount factor of a position in the scrollable advertisement in which an advertisement is presented may be used when determining the price charged to an associated advertiser. Pricing of advertisements in a scrollable advertisement unit is further described below in conjunction with FIGS. 4-5B.

The web server 260 links the online system 140 via the network 120 to the one or more client devices 110, as well as to the one or more third party systems 130. The web server 260 serves web pages, as well as other web-related content, such as JAVA®, FLASH®, XML and so forth. The web server 260 may receive and route messages between the online system 140 and the client device 110, for example, instant messages, queued messages (e.g., email), text messages, short message service (SMS) messages, or messages sent using any other suitable messaging technique. A user may send a request to the web server 260 to upload information (e.g., images or videos) that is stored in the content store 210. Additionally, the web server 260 may provide application programming interface (API) functionality to send data directly to native client device operating systems, such as IOS®, ANDROID™, WEBOS® or RIM®.

Scrollable Advertisement Unit

Figure 3:
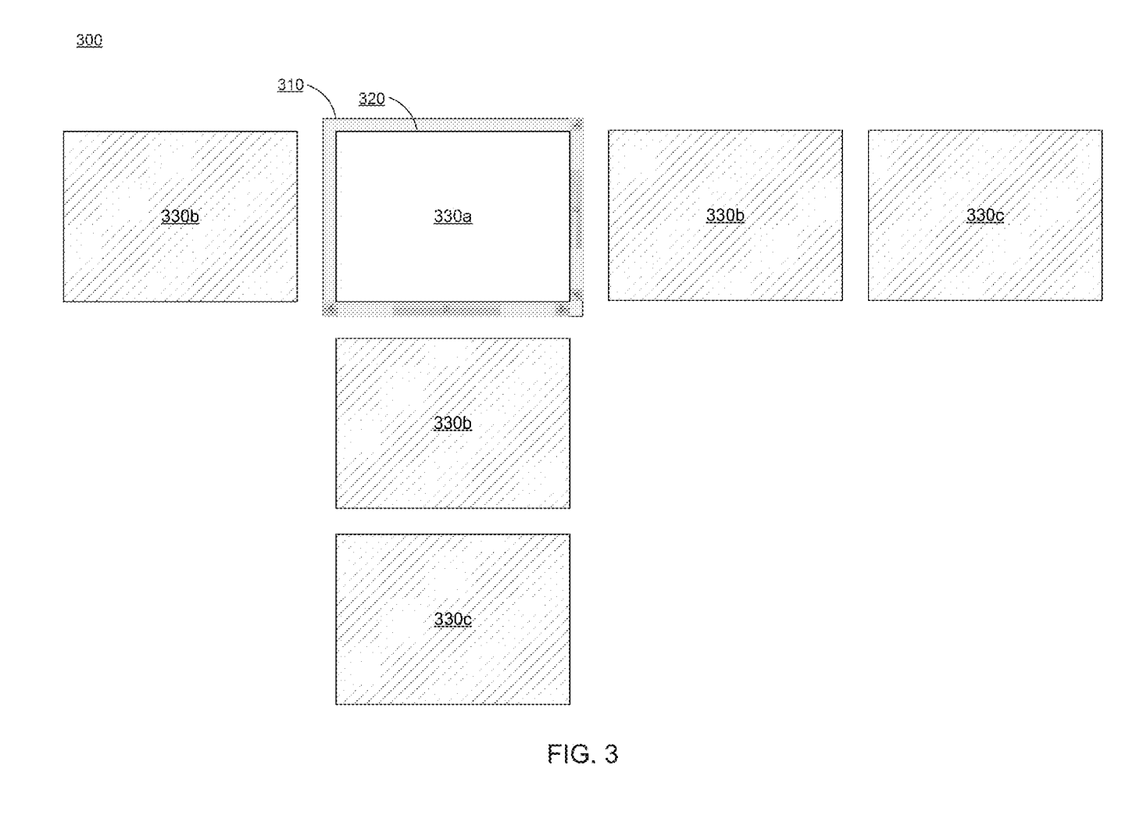
FIG. 3 is an example of a scrollable advertisement unit, in accordance with an embodiment of the invention.

FIG. 3 is an example of one embodiment of a scrollable advertisement unit. As described above, a scrollable advertisement unit 300 presents an advertisement 330a in a display area 320 when the scrollable advertisement unit 300 is rendered by a client device 110. A user may interact with the scrollable advertisement unit 300 to navigate among the advertisements 330b, 330c included in the scroll in the scrollable advertisement unit so one or more different advertisements 330b, 330c are presented in the display area 320. For example, a user may provide horizontal or vertical input to the display area 320 of the scrollable advertisement unit 300 to view different advertisements 330a, 330b in the display area 320 of the scrollable advertisement 300. In the example of FIG. 3, a user may navigate vertically or horizontally through advertisements in the scrollable advertisement unit 300 to modify what is presented via the display are 320. In one embodiment, a user may provide horizontal or vertical input to the display area of the scrollable advertisement unit to view different advertisements in the display area of the scrollable advertisement unit. For example, the scrollable advertisement unit presents a single advertisement in the display area and presents additional advertisements from the scrollable advertisement unit in the display area with when the user hovers over or clicks on a horizontal scroll tab, swipes a cursor from right to left, or provides another suitable input. To modify the advertisement included in the scrollable advertisement unit presented by the display area 320 in the example of FIG. 3, a user interacts with a scroll bar 310 in the display area 330, provides a gesture via the display area 320, moves a cursor in the display area 320, or performs any suitable interaction.

A scrollable advertisement unit 300 may have one or more features for increasing the likelihood of advertisements 330 in the scrollable advertisement unit 300 being credited with impressions. For example, one or more scrollable advertisement units 300 displayed to a user of a social networking system user in a newsfeed describing actions of additional users, advertisements 330 in the scrollable advertisement units 300 may include stories describing actions of social networking system users that an advertiser compensates the social networking system for presenting stories describing actions of users connected to the user via the social networking system. Advertisements in a scrollable advertisement unit may also be selected based on information associated with the user by the online system (e.g., user profile information, actions performed by the user, connections between the user and objects or other users).

Additionally, when a user views or interacts with an advertisement 330a presented in the display area 320, the scrollable advertisement unit 300 may automatically present an additional advertisement 330b in the display area 320. For example, if a user accesses the advertisement 330a in the display area 320, the online system 140 determines that the user has viewed the advertisement 330a. Accordingly, the online system 140 loads a tracking mechanism associated with the advertisement 330a, credits an impression to the advertisement 330a, and presents an additional advertisement 330b from the scrollable advertisement unit 300 in the display area 320. Similarly, another advertisement 330c may be presented in the display area 320 if the additional advertisement 330b is credited with an impression. Further, at least a subset of the advertisements 330 in a scrollable advertisement unit 300 may be replaced with alternative advertisements for content related to an advertisement 330 in the scrollable advertisement unit 300 with which a user has interacted. For example, if a user indicates it likes an advertisement 330a for a page presented in the display area 320, the online system 140 may replace one or more advertisements 330 in the scrollable advertisement unit 300 with other advertisements related to the page, such as advertisements for posts on the page.

Advertisement Position Assignment and Pricing

Figure 4:
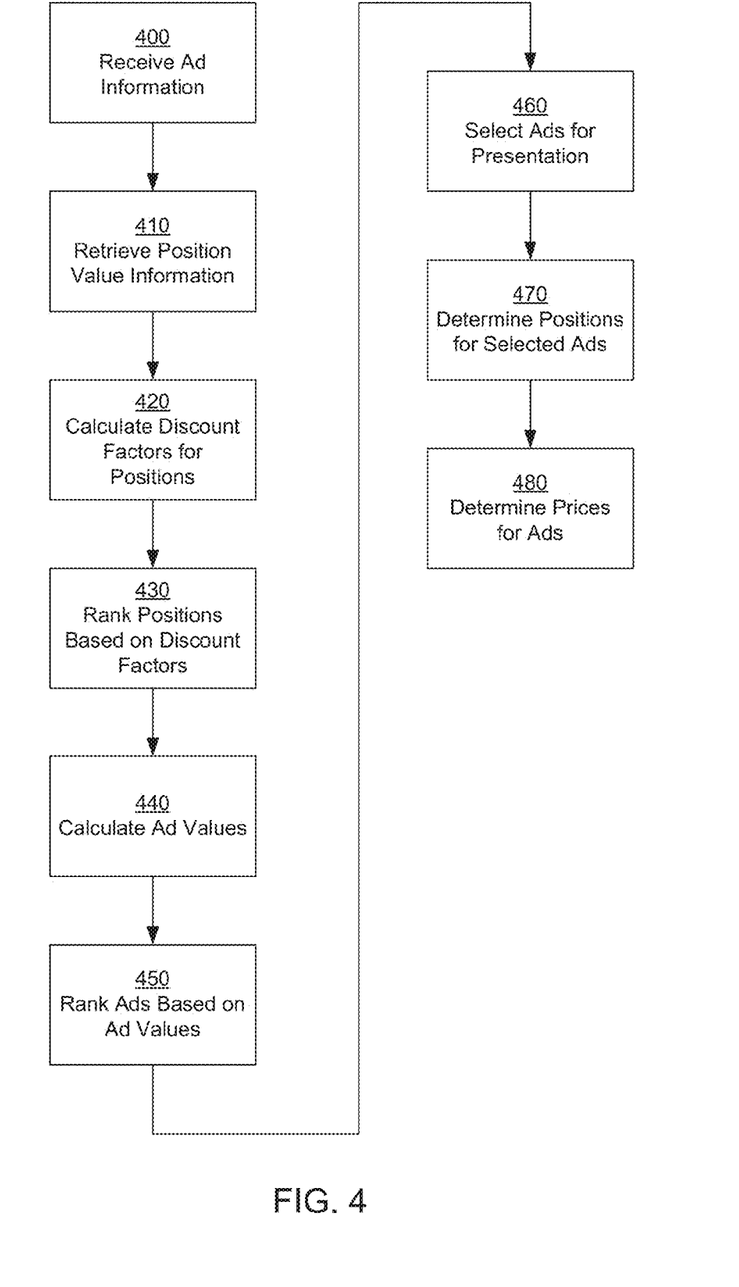
FIG. 4 is a flow chart of a method for assigning advertisements to positions in a scrollable advertisement unit and pricing advertisements in a scrollable advertisement unit, in accordance with an embodiment of the invention.

FIG. 4 is a flow chart of one embodiment of a method for determining positions of advertisements in a scrollable advertisement unit 300 and pricing advertisements included in a scrollable advertisement unit 300. The online system 140 receives 400 information about advertisements, such as ad requests, from one or more advertisers. As described above in conjunction with FIG. 2, ad requests include bid amounts, advertisement content, targeting criteria, display times, or any other suitable data describing an advertisement. When the online system 140 identifies an opportunity to serve one or more advertisements to a user of an online system using a scrollable advertisement unit, the online system 140 retrieves 410 information describing user interaction with advertisements presented in positions of a scrollable advertisement unit 300. For example, historical click-through-rates for advertisements presented in various positions of a scrollable advertisement unit 300 is retrieved 410.

Based on the position value information, the discount factor calculator 240 calculates 420 discount factors for various the positions in the scrollable advertisement unit 300. As described above in conjunction with FIG. 2, a discount factor associated with a position provides a measure of the predicted performance of an advertisement in the position. Positions in the scrollable advertisement unit 300 less likely to result in presentation of an advertisement to a user are given larger discounts. For example, if a scrollable advertisement unit 300 allows a user to navigate through advertisements in a single axis, the first position receives no discount (e.g., a discount factor of 1.0) because of the high likelihood of a user viewing the advertisement while the last position (i.e., the position requiring the user to navigate the furthest to view) receives the largest discount (e.g., a discount factor of 0.05). Discount factors for positions may be stored by the online system 140 and subsequently accessed to prevent recalculation of the discount factors for various presentation of the scrollable advertisement unit 300. For example, discount factors associated with positions in a scrollable advertisement unit 300 with 10 positions for which a user navigates horizontally through advertisements remains constant for similar scrollable advertisement units 300.

Figure 5A:
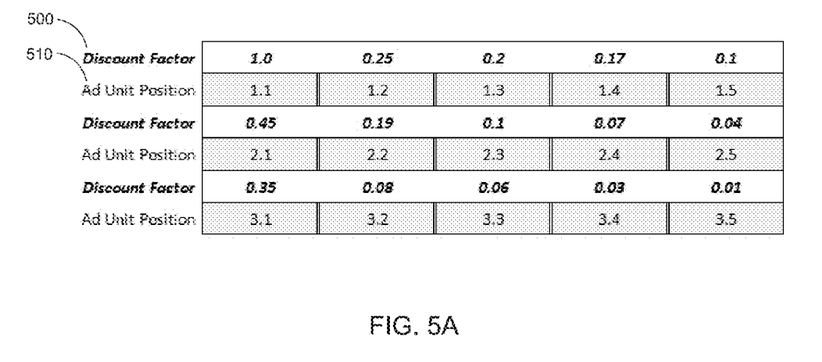
FIGS. 5A and 5B illustrate a method for assigning advertisements to positions in a scrollable advertisement unit, in accordance with an embodiment of the invention.
Figure 5B:
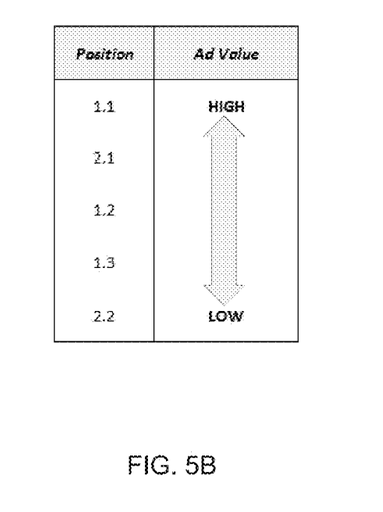

Based on the discount factors, the online system 140 ranks 430 the positions in the scrollable advertisement unit 300. In one embodiment, the positions are ranked 430 so the position providing the smallest discount (i.e., the highest discount factor) has the highest ranking. In the example of FIG. 5A, the discount factor associated with position 1.1 (i.e., row 1, column 1 in a scrollable advertisement unit 300 allowing a user to scroll horizontally and vertically) is 1.0, so position 1.1 has the highest ranking, and the discount factor associated with position 2.1 is 0.45, so position 2.1 has the second-highest ranking. As shown in the example of FIG. 5B, the positions are ranked in descending order by discount factor.

When the online system 140 receives a request to present a scrollable advertisement unit 300 to a user, the online system 140 selects candidate advertisements stored in the ad request store 235. For example, the online system 140 identifies candidate advertisements associated with ad requests having at least one targeting criteria satisfied by characteristics of the user to be presented with the scrollable advertisement unit. The ad value calculator 245 may modify an advertisement's bid amount by a scaling factor to calculate 440 an ad value for the advertisement. For example, the scaling factor is based on a probability of the advertisement being presented to the user if associated with a particular position of the scrollable advertisement unit 300. For example, an advertisement's ad value is the product of the advertisement's bid amount and its scaling factor. In some embodiments, an advertisement's scaling factor is also based on the probability of the advertisement being presented to the user based on advertisement characteristics (e.g., characteristics that prevent presentation of the advertisement) may be used when calculating 440 an ad's ad value. For example, an ad value of an advertisement may be the product of the advertisement's bid amount, probability of being presented to the user based on advertisement characteristics, and probability of being presented to the user if associated with a particular position in the scrollable advertisement unit 300. In one embodiment, if an advertisement's bid amount is specified using a cost-per-click basis, the bid amount is converted into a cost-per-impression value; for example, a cost-per-click bid amount is multiplied by the click-through rate for the advertisement to determine a cost-per-impression bid amount.

Based on the ad values, the candidate advertisements are ranked 450, and advertisements are selected 460 from the candidate advertisements based at least in part on the ranking. For example, the highest ranked advertisements are selected 460 for presentation 460 via a scrollable advertisement unit 300. As another example, advertisements having at least a threshold location in the ranking are selected 460 for inclusion in the scrollable advertisement unit.

The positions of the selected advertisements in the scrollable advertisement unit are determined 470 based on the ranking of the positions of the scrollable advertisement unit 300 based on their discount factors and the ranking of the one or more advertisements in the plurality of advertisements based on their ad values. In the example of FIGS. 5A and 5B, the online system 140 determines 470 the position of advertisements in a scrollable advertisement unit by associating an advertisement with a position having a location in the ranking of positions matching the location of the advertisement in the ranking of advertisements. In the example of FIGS. 5A and 5B, the advertisement with the highest ad value is assigned to position 1.1, which is the highest ranking position because it has the highest discount factor of 1.0. Similarly in FIGS. 5A and 5B, the advertisement with the second highest ad value is assigned to position 2.1 because position 2.1 has the second highest discount factor of 0.45, etc. In one embodiment, advertisements are mapped to positions until an advertisement is associated with each position in the scrollable advertisement unit 300. Alternatively, the advertisement ranking determines the order in which advertisements are displayed to a user regardless of which direction a user navigates through the scrollable advertisement unit. For example, in a scrollable advertisement unit 300 that allows a user to scroll horizontally and vertically, the advertisements may be presented to the user in the order they are ranked regardless of the direction in which the user scrolls.

Advertisements having bid amounts specified using a cost-per-click amount may be placed in positions with lower discount factors (e.g., areas outside the display area 320 of a scrollable advertisement unit 300). The probability that a user accesses an advertisement increases in proportion to the amount of navigation needed to present the advertisement in the display area 320 due to a self-selecting bias (i.e., users willing to scroll to view additional advertisements are more likely to be interested in those additional advertisements and access the additional advertisements). Because of the cost-per-click pricing, the lower likelihood of the advertisement being presented is offset by the increased likelihood of the user accessing the advertisement once it is presented.

Based in part on the bid amounts of the advertisements selected for inclusion in the scrollable advertisement unit, the price for each advertisement included in the scrollable advertisement unit 300 is determined 480 by the price calculator 255. The price of an advertisement may be based on the bid amount of an additional advertisement having a lower ranking in the advertisement ranking and scaling factors associated with the advertisement and with the additional advertisement. For example, if advertisement B1 is the selected advertisement and advertisement B2 has the next-highest location in the ranking of advertisements than advertisement B1, the price for presenting advertisement B1 is:

$$(\text{Bid}_{B2})[(\text{Scaling Factor})_{B2}/(\text{Scaling Factor})_{B1}]$$

where $\text{Bid}_{B2}$ is the bid amount for advertisement B2 (specified on a cost-per-impression basis); Scaling Factor$_{B2}$ is the scaling factor for advertisement B2, which may be based on the probability of advertisement B2 being presented to the user based on characteristics of advertisement B2 as well as the probability of advertisement B2 being presented to the user if associated with a particular position in the scrollable advertisement unit 300; Scaling Factor$_{B1}$ is the scaling factor for advertisement B1, which may be based on the probability of advertisement B1 being presented to the user based on characteristics of advertisement B1 as well as the probability of advertisement B1 being presented to the user if associated with a particular position in the scrollable advertisement unit 300. In one embodiment, the price for presenting advertisement B1 may also be modified by the discount factor for advertisement B1, given its position in the scrollable advertisement unit. For example, the discount factor for presenting advertisement B1 based on its position in the scrollable advertisement unit 300 is multiplied by the price calculated above. As described above, if an advertisement's bid amount is specified in a cost-per-click value, the bid amount is converted to a cost-per-impression value.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
identifying an opportunity to present a plurality of advertisements to a user of an online system using a scrollable advertisement unit, the scrollable advertisement unit comprising a plurality of positions and a display area, each of the plurality of positions including an advertisement from the plurality of advertisements, and the display area presenting a single advertisement associated with a single position of the plurality of positions, wherein the scrollable advertisement unit is displayed as a sub-portion of a newsfeed on a mobile device of the user, and wherein the scrollable advertisement unit further includes a user interface element, that when interacted with by the user, causes the scrollable advertisement unit to modify the display area;
calculating a discount factor associated with each position of the plurality of positions, the calculation of the discount factor based on a predicted performance of an advertisement in each position;
ranking the plurality of positions according to the discount factor for each position;
computing ad values for each of the plurality of advertisements for each of the plurality of positions, an ad value for each advertisement at each position being a product of a bid amount of the advertisement, a probability value indicating a probability of the advertisement being presented to the user, and a probability value indicating a probability of the advertisement being presented to the user at the position;
ranking each of the plurality advertisements for each position of the plurality of positions according to the ad value of each of the plurality advertisements at the position;
selecting an advertisement of the plurality advertisements to associate with each position of each of the plurality of positions by selecting an advertisement of the plurality advertisements with a highest ad value at the position;
generating the scrollable advertisement unit to include at each of the plurality of positions the selected advertisement for that position; and
transmitting the scrollable advertisement unit to the mobile device of the user for display to the user on a display of the mobile device of the user.

2. The method of claim 1, further comprising:
retrieving information describing an amount of user interaction with content associated with each position of the plurality of positions; and
computing a discount factor associated with each position based at least in part on the retrieved information, the discount factor comprising a measure of predicted performance of an advertisement in each position.

3. The method of claim 2, wherein computing the discount factor associated with each position based at least in part on the retrieved information comprises:
determining a probability of the user viewing content in a position;
determining a likelihood of the user accessing content in the position; and
determining the discount factor for the position based on the probability of the user viewing content in the position and the likelihood of the user accessing content in the position.

4. The method of claim 3, wherein determining the discount factor for the position based on the probability of the user viewing content in the position and the likelihood of the user accessing content in the position comprises:
determining a product of the probability of the user viewing content in the position and the likelihood of the user accessing content in the position.

5. The method of claim 2, wherein the information describing an amount of user interaction with content associated with each position of the plurality of positions comprises: historical user interaction information associated with content previously associated with one or more positions of the plurality of positions, a number of users indicating a preference for an advertisement presented in a position, a percentage of users indicating the preference for the advertisement presented in the position, a number of users accessing the advertisement presented in the position, a percentage of users accessing the advertisement presented in the position, and any combination thereof.

6. The method of claim 1, wherein the probability of the advertisement being presented to the user is determined based on at least one of: targeting criteria, content associated with a privacy setting of the user, content associated with a product or service previously purchased by the user, content associated with a product or service the user has installed, and any combination thereof.

7. The method of claim 1, further comprising:
receiving information describing the plurality of advertisements from one or more advertisers.

8. The method of claim 7, wherein the information describing the plurality of advertisements is selected from a group consisting of: advertisement content for an advertisement, targeting criteria for the advertisement, display times for the advertisement, and any combination thereof.

9. The method of claim 1, wherein the online system is a social networking system.

10. The method of claim 9, wherein the plurality of advertisements includes one or more stories associated with content maintained by the social networking system.

11. The method of claim 1, further comprising:
storing the discount factor associated with each position.

12. The method of claim 1, wherein the scrollable advertisement unit is configured to automatically present a lower ranked advertisement in the display area of the scrollable advertisement unit upon receiving an indication that the user has viewed the advertisement in the display area of the scrollable advertisement unit.

13. The method of claim 1, further comprising:
receiving, from the mobile device of the user, an indication that the user has viewed the advertisement in the display area of the scrollable advertisement unit; and
transmitting a message to the mobile device of the user to cause the scrollable advertisement unit to display a lower ranked advertisement in the display area of the scrollable advertisement unit.

14. The method of claim 1, further comprising:
receiving, from the mobile device of the user, an indication that the user has performed an interaction with an advertisement in the display area of the scrollable advertisement unit; and
selecting alternative advertisements that are related to content that is indicated in the advertisement in the display area of the scrollable advertisement unit; and
transmitting a message to the mobile device of the user to cause the scrollable advertisement unit to replace a subset of the one or more advertisements in scrollable advertisement unit with the alternative advertisements.

15. A method comprising:
receiving information describing a plurality of advertisements from one or more advertisers, the information including a bid amount associated with each advertisement in the plurality of advertisement;
identifying an opportunity to present a plurality of advertisements to a user of an online system using a scrollable advertisement unit, the scrollable advertisement unit comprising a plurality of positions and a display area, each of the plurality of positions including an advertisement from the plurality of advertisements, and the display area presenting a single advertisement associated with a single position of the plurality of positions, wherein the scrollable advertisement unit is displayed as a sub-portion of a newsfeed on a mobile device of the user, and wherein the scrollable advertisement unit further includes a user interface element, that when interacted with by the user, causes the scrollable advertisement unit to modify the display area;
computing a discount factor associated with each position of the plurality of positions, the computation of the discount factor based on a predicted performance of an advertisement in each position;
computing ad values for each of the plurality of advertisements for each of the plurality of positions, an ad value for each advertisement at each position being a product of a bid amount of the advertisement, a probability value indicating a probability of the advertisement being presented to the user, and a probability value indicating a probability of the advertisement being presented to the user at the position;
ranking each of the plurality of advertisements for each position of the plurality of positions according to the ad value of each of the plurality of advertisements at the position;
determining each position in the scrollable advertisement unit to associate with each advertisement of the plurality of advertisement by selecting an advertisement of the plurality of advertisements with a highest ad value for each position, each position ranked according to the discount factor for the position; and
generating the scrollable advertisement unit including the one or more advertisements associated with the one or more positions; and
transmitting the scrollable advertisement unit to the mobile device of the user for display to the user on a display of the mobile device of the user.

16. The method of claim 15, further comprising:
retrieving information describing an amount of user interaction with content associated with each position of a plurality of positions of the scrollable advertisement unit; and
computing the discount factor associated with each position based at least in part on the retrieved information, the discount factor comprising a measure of predicted performance of an advertisement in each position.

17. The method of claim 16, wherein computing the discount factor associated with each position based at least in part on the retrieved information comprises:
determining a probability of the user viewing content in a position of the plurality of positions;
determining a likelihood of the user accessing content in the position of the plurality of positions; and
determining the discount factor for the position based on the probability of the user viewing content in the position of the plurality of positions and the likelihood of the user accessing content in the position of the plurality of positions.

18. The method of claim 17, wherein determining the discount factor for the position of the plurality of positions based on the probability of the user viewing content in the position of the plurality of positions and the likelihood of the user accessing content in the position of the plurality of positions comprises:
determining a product of the probability of the user viewing content in the position of the plurality of positions and the likelihood of the user accessing content in the position.

19. The method of claim 16, wherein the information describing the amount of user interaction with content associated with each position of the plurality of positions comprises historical user interaction information associated with content previously associated with one or more positions of the plurality of position.

20. The method of claim 15, wherein the online system is a social networking system.

21. The method of claim 20, wherein the plurality of advertisements includes one or more stories associated with content maintained by the social networking system.

22. The method of claim 15, further comprising:
storing the discount factor associated with each position.

* * * * *